United States Patent
Maesono

(10) Patent No.: US 9,823,886 B2
(45) Date of Patent: Nov. 21, 2017

(54) ELECTRONIC DEVICE CAPABLE OF PERFORMING OVERWRITE ERASURE OF OBSOLETE FILE AND COMPUTER-READABLE NON-TRANSITORY STORAGE MEDIUM

(71) Applicant: KYOCERA Document Solutions Inc., Osaka (JP)

(72) Inventor: Yuya Maesono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/382,636

(22) Filed: Dec. 17, 2016

(65) Prior Publication Data

US 2017/0177284 A1 Jun. 22, 2017

(30) Foreign Application Priority Data

Dec. 17, 2015 (JP) ................. 2015-246282

(51) Int. Cl.
| | |
|---|---|
| G06K 15/00 | (2006.01) |
| G06F 13/00 | (2006.01) |
| G06F 3/12 | (2006.01) |
| H04N 1/00 | (2006.01) |
| G06F 12/121 | (2016.01) |
| G06F 12/12 | (2016.01) |
| G06K 15/02 | (2006.01) |

(52) U.S. Cl.
CPC ............ *G06F 3/1274* (2013.01); *G06F 3/122* (2013.01); *G06F 3/1208* (2013.01); *G06F 3/1275* (2013.01); *H04N 1/00408* (2013.01); *G06F 12/12* (2013.01); *G06F 12/121* (2013.01); *G06K 15/1861* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,046,109 | A * | 9/1991 | Fujimori | G06K 9/4609 382/144 |
| 6,128,096 | A * | 10/2000 | Furuya | G06K 15/02 358/1.13 |
| 6,307,578 | B1 * | 10/2001 | Castelli | G03G 15/0152 347/116 |
| 6,330,572 | B1 * | 12/2001 | Sitka | G06F 17/30082 707/608 |

(Continued)

FOREIGN PATENT DOCUMENTS

JP 2011-165080 A 8/2011

*Primary Examiner* — Miya J Williams
(74) *Attorney, Agent, or Firm* — Hawaii Patent Services; Nathaniel K. Fedde; Kenton N. Fedde

(57) ABSTRACT

To provide an electronic device that can restrict a delayed execution of a process whose existence is impossible to confirm for an overwrite erasure thread. An MFP includes a job execution part that executes a job and an overwrite erasure thread that performs overwrite erasures of obsolete files. The overwrite erasure thread performs the overwrite erasures intermittently even while the job is in execution if the obsolete files have a size more than a threshold value size. The job execution part performs the overwrite erasures while the job is in execution if the obsolete files have a size less than the threshold value size.

5 Claims, 8 Drawing Sheets

(56) References Cited

U.S. PATENT DOCUMENTS

| | | | | | |
|---|---|---|---|---|---|
| 8,307,251 | B2* | 11/2012 | Yamada | ............... | H04L 67/00 |
| | | | | | 358/1.13 |
| 8,582,160 | B2* | 11/2013 | Takashima | ............ | G06F 3/1212 |
| | | | | | 358/1.13 |
| 2002/0026566 | A1* | 2/2002 | Awada | ................ | G06F 11/1456 |
| | | | | | 711/162 |
| 2006/0291798 | A1* | 12/2006 | Suneya | ................ | G11B 27/034 |
| | | | | | 386/232 |
| 2007/0070385 | A1* | 3/2007 | Okamoto | ............... | G06K 15/02 |
| | | | | | 358/1.14 |
| 2008/0071723 | A1* | 3/2008 | Joshi | ................ | G06F 17/30067 |
| 2009/0303518 | A1* | 12/2009 | Sekiya | ................. | G06F 21/608 |
| | | | | | 358/1.15 |
| 2010/0010967 | A1* | 1/2010 | Muller | .............. | G06F 17/30587 |
| | | | | | 707/E17.014 |
| 2017/0031959 | A1* | 2/2017 | Zayas | .................. | G06F 3/0631 |

* cited by examiner

ELECTRONIC DEVICE CAPABLE OF PERFORMING OVERWRITE ERASURE OF OBSOLETE FILE AND COMPUTER-READABLE NON-TRANSITORY STORAGE MEDIUM

INCORPORATION BY REFERENCE

This application is based on and claims the benefit of priority from Japanese Patent Application No. 2015-246282 filed on Dec. 17, 2015, the contents of which are hereby incorporated by reference.

BACKGROUND

The present disclosure relates to an electronic device that is capable of performing an overwrite erasure of an obsolete file that is unnecessary for a job and a computer-readable non-transitory storage medium.

In a typical technology, as an electronic device that is capable of performing an overwrite erasure of an obsolete file that is unnecessary for a job, there has been known such one that includes a overwrite erasure thread for performing an overwrite erasure of a file. The overwrite erasure thread of the typical electronic device is configured to perform an overwrite erasure of the obsolete file that is unnecessary for the job while the job is out of execution.

SUMMARY

An electronic device of the present disclosure includes a job execution part that execute a job and an overwrite erasure part that perform an overwrite erasure of a file. The overwrite erasure part performs the overwrite erasure intermittently while the job is out of execution if the obsolete file among files that are made obsolete in the job is of a size greater than a specified size. The job execution part performs the overwrite erasure while the job is in execution if the obsolete file is of a size less than the specified size.

A computer-readable non-transitory storage medium of the present disclosure stores an information processing program that is executable by a computer of an electronic device. The information processing program, when executing by the computer, causes the computer to act as a job execution part that executes a job and an overwrite erasure part that performs an overwrite erasure of a file. The overwrite erasure part performs the overwrite erasure intermittently while the job is out of execution if the obsolete file among files that are made obsolete in the job is of a size greater than a specified size. The job execution part performs the overwrite erasure while the job is in execution if the obsolete file is of a size less than the specified size.

DETAILED DESCRIPTION

Hereinbelow, with reference to the attached drawings, a description is made as to an exemplary embodiment of the present disclosure.

First of all, a configuration of an MFP (Multifunctional Peripheral) is described that is an aspect of an electronic device according to an exemplary embodiment of the present disclosure.

Figure 1:
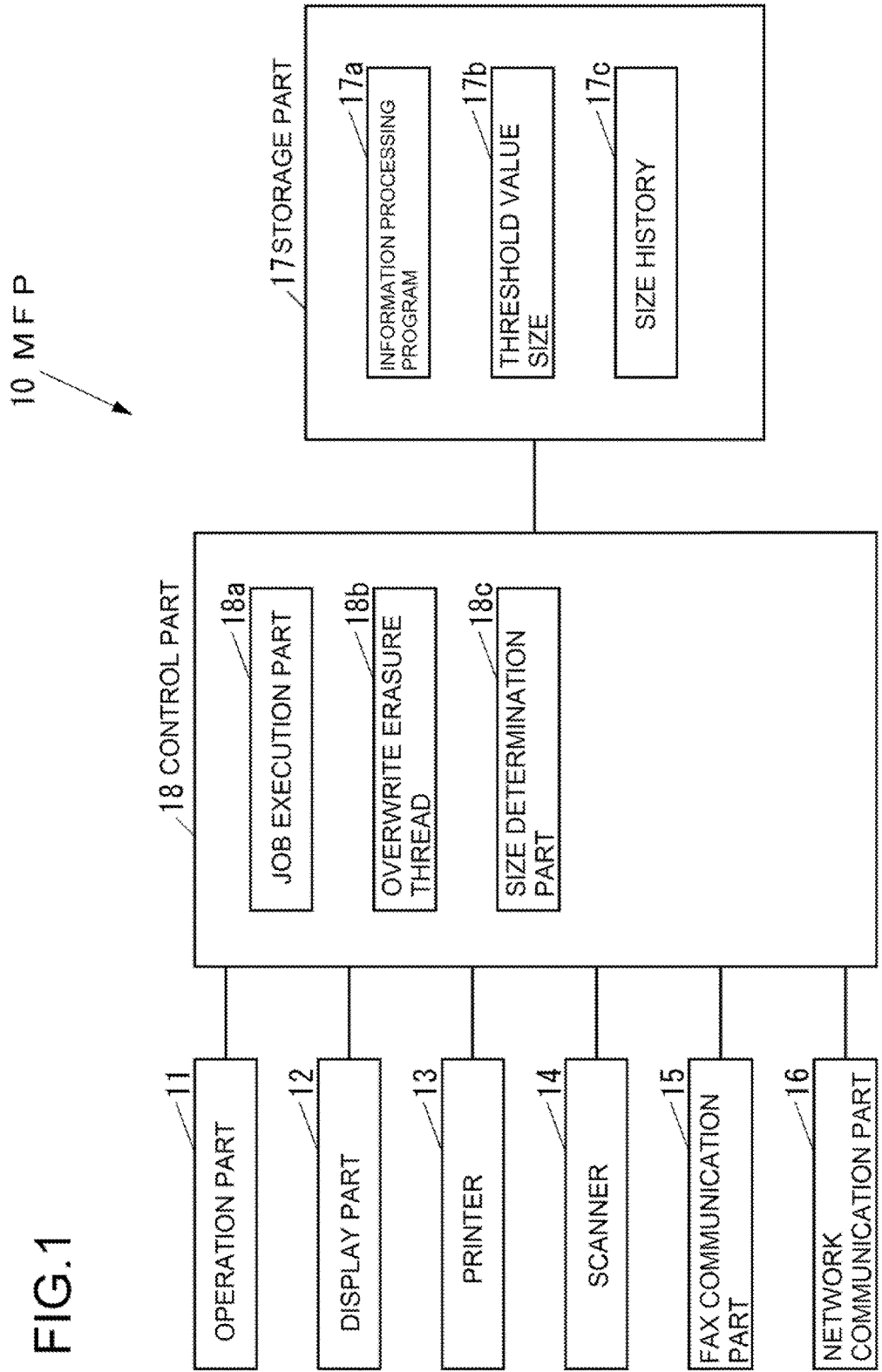
FIG. 1 illustrates a configuration of an MFP according to an exemplary embodiment of the present disclosure.

FIG. 1 illustrates the configuration of the MFP 10 according to the present exemplary embodiment.

As illustrated in FIG. 1, the MFP 10 includes an operation part 11 that is a collection of input devices such as buttons to which various inputs are provided, a display part 12 that is in the form of, for example, a display device such as an LCD (Liquid Crystal Display) for displaying various pieces of information, a printer 13 that is a printing device for making a printing on a recording medium such as sheet or the like, a scanner 14 that is a reading device for reading an image from a manuscript, a FAX communication part 15 that is a facsimile device for establishing a facsimile communication with an external facsimile device via communication line such as a public telephone line, a network communication part 16 that is a network communication device for establishing a communication to an external device via a network such as the Internet, a storage part 17 that is in the form of non-voltaic storage devices including, for examples, semiconductor memories and HDDs (Hard Disk Drives), and a control part 18 that controls the whole of the MFP 10.

The storage part 17 stores an information processing program 17a. The information processing program 17a may be installed into the MFP 10 while the MFP 10 is in production, may be installed additionally into the MFP 10 from an external storage medium such as a USB (Universal Serial Bus) memory, or may be may be installed additionally into the MFP 10 from on the network.

The storage part 17 stores a threshold value size 17b that is indicative of a file size as a threshold value for the determination of a method of an overwrite erasure and a size history 17c that is indicative of an occurrence history of obsolete files i.e., files that have been made unnecessary in a job.

The control part 18 includes, for example, a CPU (Central Processing Unit), ROMs (Read Only Memories) that store programs and various data, and a RAM (Random Access Memory) that is to be used as a working area of the CPU. The CPU executes the programs that are stored in the ROM or the storage part 17.

The control part 18 executes the information processing program 17a stored in the storage part 17 to function as a job execution part 18a for executing a job, an overwrite erasure thread 18b as an overwrite erasure part for erasing a file by overwrite processing, and a size determination part 18c for determining the threshold value size 17b.

Here, the job is a sequential of process flow that occurs in response to an operation by a user and whose existence can be detected by the overwrite erasure thread. For example, the jobs include a storage job for causing the storage part 17 to store the data of the image of the manuscript that is read by the scanner 14 or for causing the storage part 17 to store data that is received via the network communication part 16. In addition, the jobs include a print job that causes the printer 13 to perform a print operation based on print data that is received via the network communication part 16. Further, the jobs include a copy job that causes the printer 13 to perform a print operation based on data of the image that is read from a manuscript by the scanner 14. Moreover, the jobs include a scan job that causes the scanner 14 to read an image from a manuscript.

The overwrite erasure thread 18b may executed in a background.

Next, an operation of the MFP 10 is described.

At first, a description is made as to an operation of the MFP 10 when a file that has been made unnecessary in a job is processed i.e. an obsolete file is processed in the job.

The file that has been made unnecessary is in job, for example, in a case of the storage job, a temporally created file for creating a file of an object to be stored. The temporally created file for creating a file of an object to be stored will be made unnecessary after the creation of the file of the object.

Figure 2:
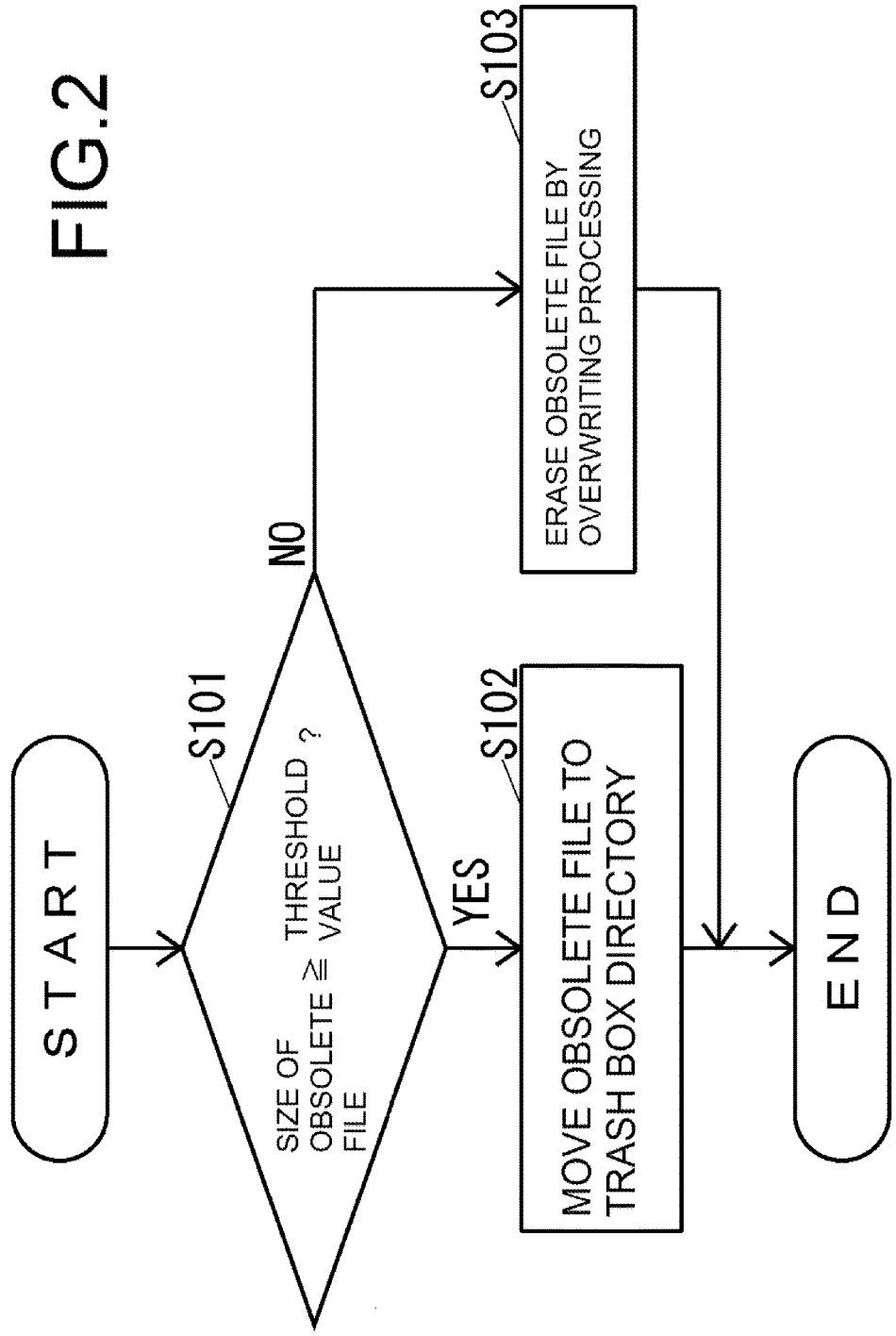
FIG. 2 illustrates operation steps of the MFP illustrated in FIG. 1 when a job processes an obsolete file in a job.

When a file is made unnecessary while a job is in execution, the job execution part 18a executes an operation illustrated in FIG. 2. More specifically, the operation illustrated in FIG. 2 is executed while the job is in execution.

FIG. 2 illustrates a flowchart that is indicative of how the MFP 10 operates for processing the obsolete file in the job.

As illustrated in FIG. 2, the job execution part 18a determines whether or not the size of the obsolete file is more than the threshold value size 17b (S101).

Figure 3:
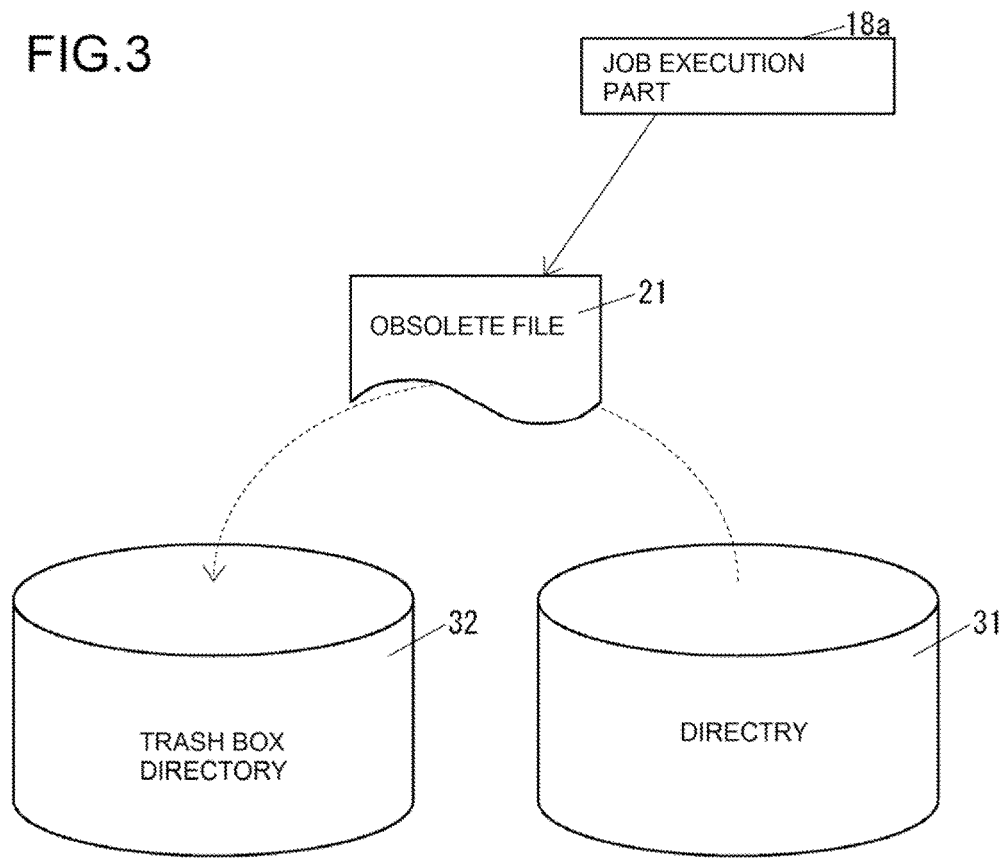
FIG. 3 illustrates an example of an operation of the job execution part illustrated in FIG. 1 when the obsolete file is moved from a current directory to a trash box directory.

If the job execution part 18a determines that the size of the obsolete file is more than the threshold value size 17b at S101, as illustrated in FIG. 3, the job execution part 18a moves the obsolete file whose size is more than the threshold value size 17b from a current directory 31 to a trash box directory 32 as a specified directory (S102). It is to be noted that the directory 31 and the trash box directory 32 are specified virtual memory area provided in the storage part 17 and otherwise another storage device. When the obsolete file 21 is moved from the directory 31 to the trash box directory 32, such a movement is made on a file system and actually no physical movement is made. In brief, the directory linked to the obsolete file 21 is changed from the directory 31 to the trash box directory 32.

Figure 4:
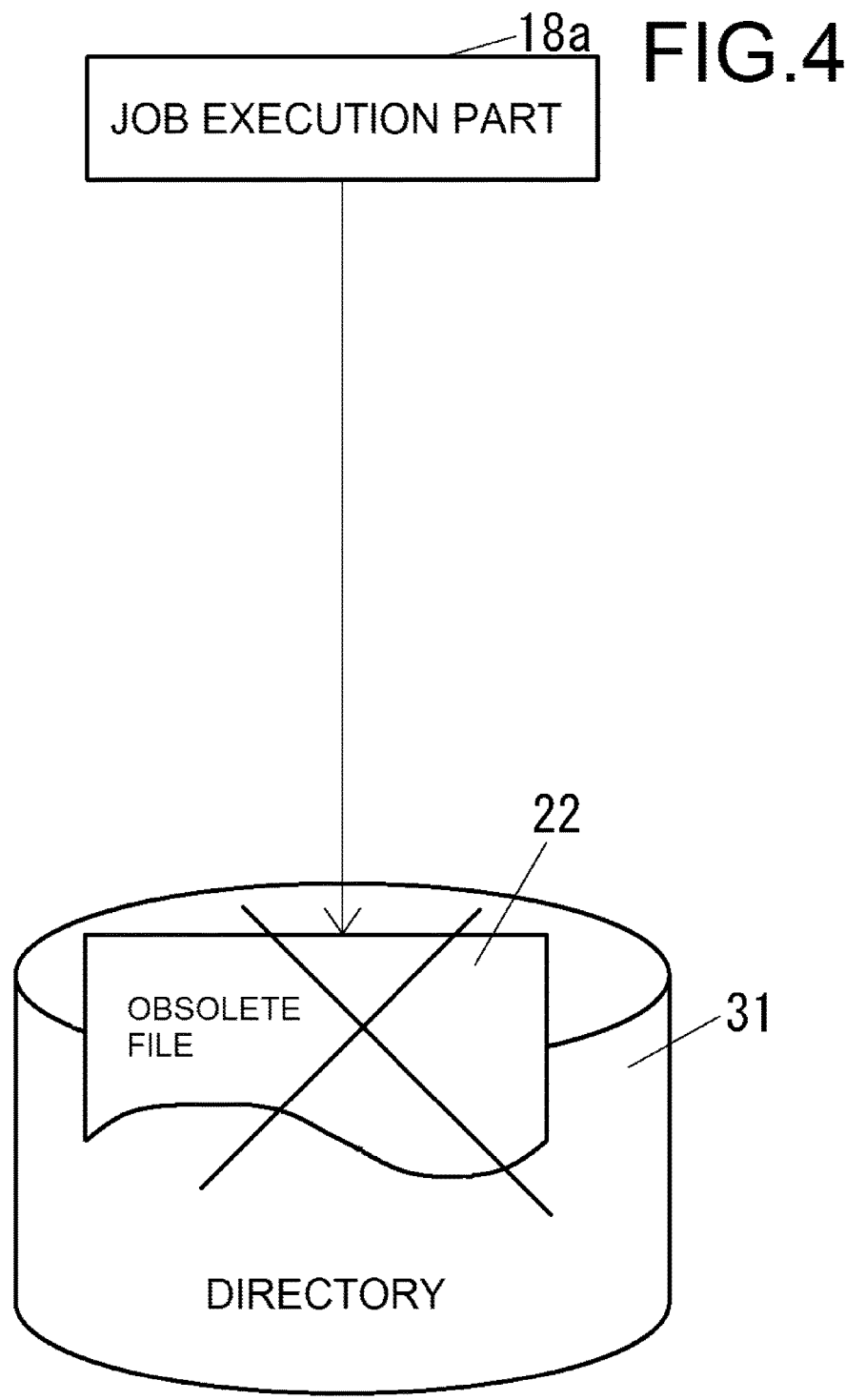
FIG. 4 illustrates an example of an operation of the job execution part illustrated in FIG. 1 when the obsolete file is erased by overwriting processing in a job.

If the job execution part 18a determines that the size of the obsolete file is not more than the threshold value size 17b i.e. is less than the threshold value size 17b at S101, as illustrated in FIG. 4, the job execution part 18a erases, by overwrite process, the obsolete file whose size is less than the threshold value size 17b (S103). Here, the overwrite erasure executed by the job execution part 18a is to delete the obsolete file 22 from the file system after overwriting specific data such as random data a specified number of times, (e.g. 3 times). A user may define the number of overwriting in the overwrite erasure.

The job execution part 18a terminates, after completion of the process of S102 or the process of S103, terminates the operation illustrated in FIG. 2.

Next, a description is made as to an operation of the MFP 10 when an obsolete file in the trash box directory 32 is erased by overwrite processing.

Figure 5:
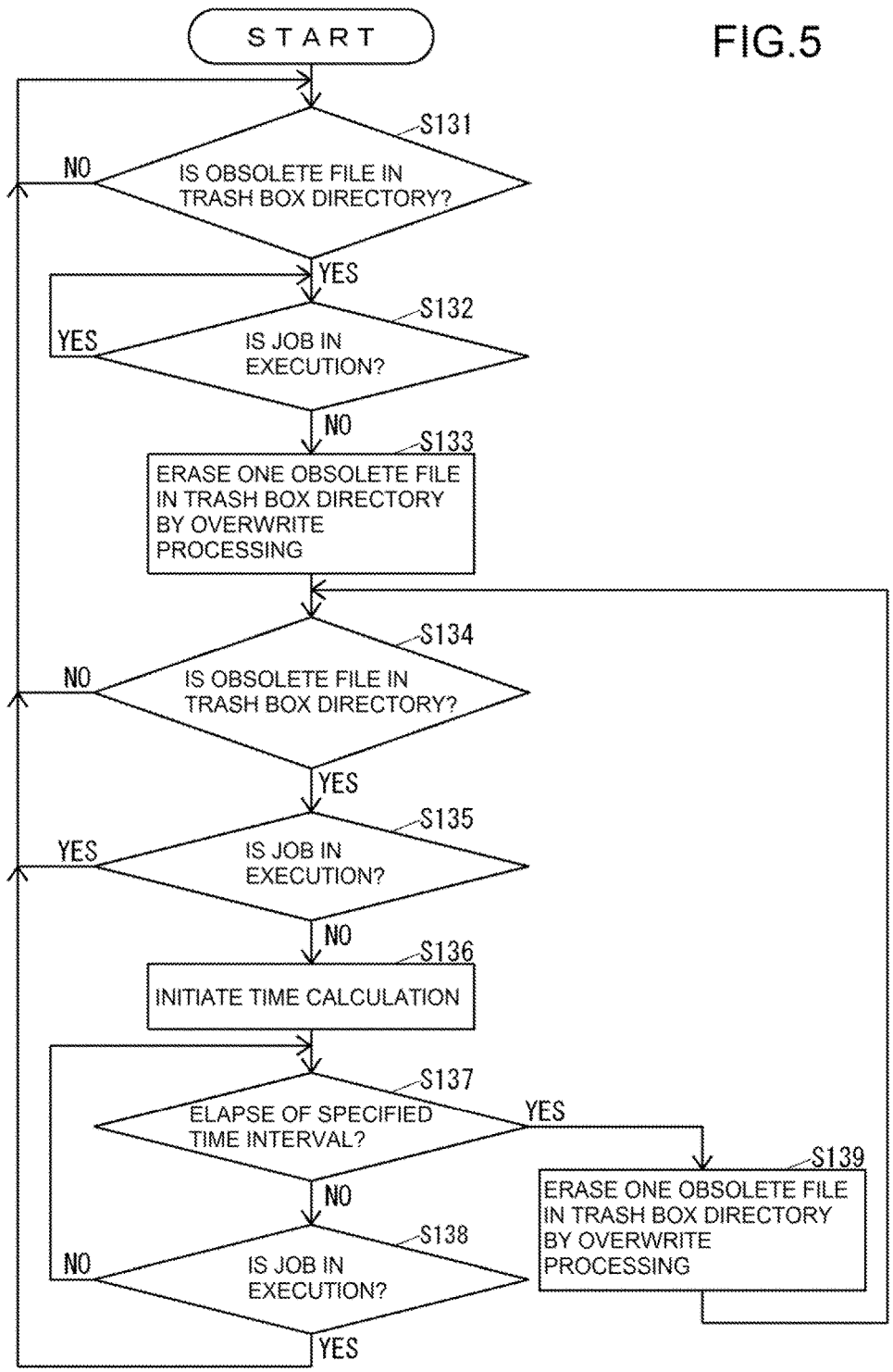
FIG. 5 illustrates operation steps of the MFP illustrated in FIG. 1 when the obsolete file that is in the trash box directory is erased by overwrite processing.

The overwrite erasure thread 18b executes an operation that is illustrated in FIG. 5 while the MFP 10 is in active.

FIG. 5 illustrates operation steps of the MFP 10 when the obsolete file 21 that is in the trash box directory 32 is erased by overwrite processing.

As illustrated in FIG. 5, the overwrite erasure thread 18b determines whether or not the obsolete file 21 is in the trash box directory 32 (S131). More specifically, the overwrite erasure thread 18b has a monitoring function of monitoring the trash box directory 32.

If the overwrite erasure thread 18b determines that the obsolete file 21 is not in the trash box directory 32 at S131, the overwrite erasure thread 18b performs the process of S131.

If the overwrite erasure thread 18b determines that the obsolete file 21 is in the trash box directory 32 at S131, the overwrite erasure thread 18b continues to determine whether or not the job execution part 18a executes job (s) until finds that no job is in execution by the job execution part 18a (S132). In the present exemplary embodiment, in a case where plural jobs are to be executed in succession, the job execution part 18a recognizes of job being in execution until termination of all execution of the plural jobs. It is to be noted that, even though plural jobs are to be executed in succession, the job execution part 18a is allowed to recognize of job being in execution for each job.

Figure 6:
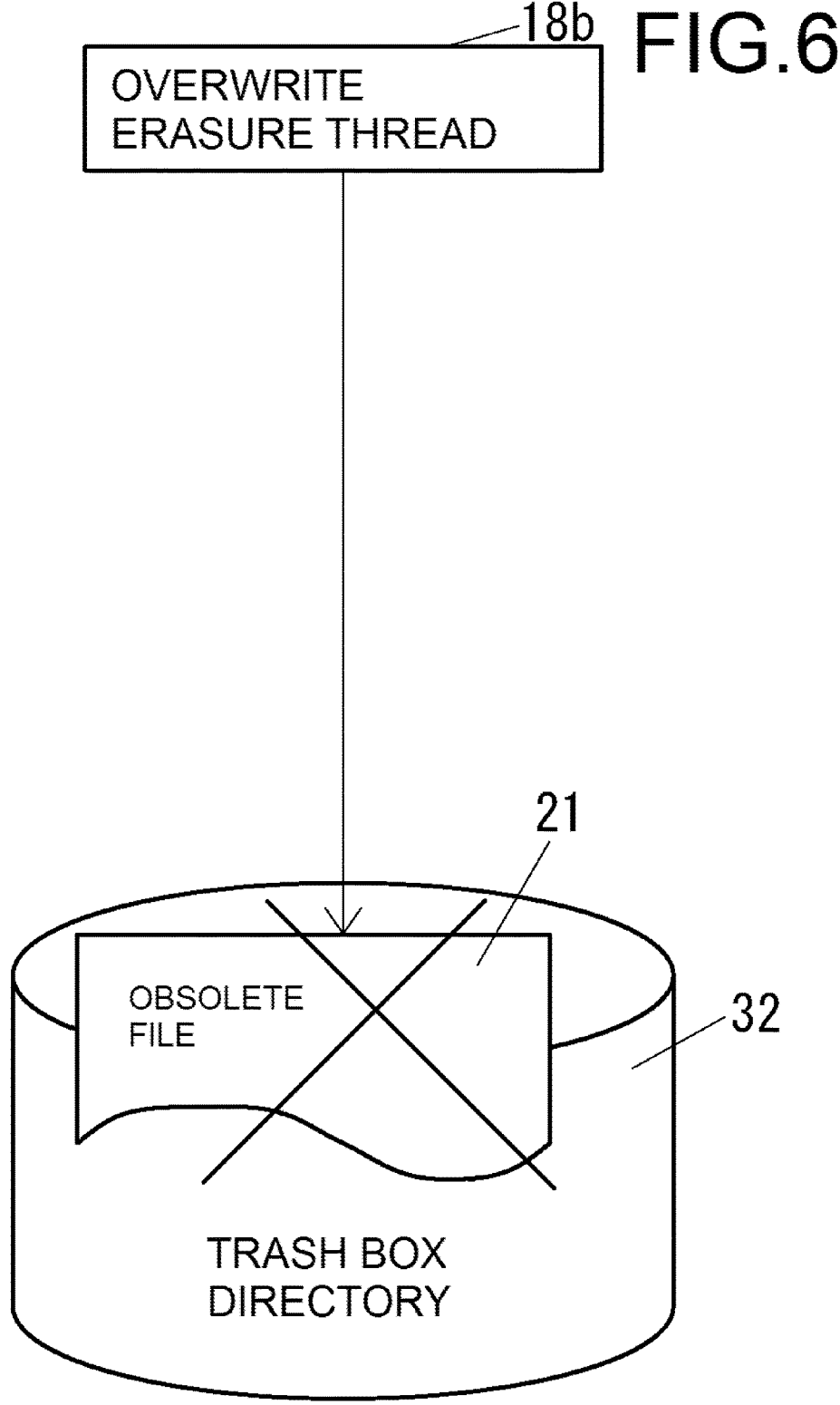
FIG. 6 illustrates an example of an operation of the overwrite erasure thread illustrated in FIG. 1 when the obsolete file that is in the trash box directory is erased by overwrite processing.

If the overwrite erasure thread 18b determines that no jobs are found to be in execution by the job execution part 18a at S132, the overwrite erasure thread 18b erases, as illustrated in FIG. 6, an obsolete file 21 in the trash box directory 32 by overwrite processing (S133). Here, the overwrite erasure performed by the overwrite erasure thread 18b is to delete the obsolete file 21 from the file system after overwriting specific data such as random data a specified number of times, (e.g. 3 times). A user may define the number of overwriting in the overwrite erasure.

After completion of the process of S133, the overwrite erasure thread 18b determines whether or not another obsolete file 21 is in the trash box directory 32 (S134).

If the overwrite erasure thread 18b determines that no obsolete file 21 is in the trash box directory 32 at S134, the overwrite erasure thread 18b executes the process of S131.

If the overwrite erasure thread 18b determines that the other obsolete file 21 is in the trash box directory 32 at S134, the overwrite erasure thread 18b determines whether or not the job execution part 18a is executing a job (S135).

If the overwrite erasure thread 18b determines that the job execution part 18a is executing the job at S135, the overwrite erasure thread 18b executes the process of S131.

If the overwrite erasure thread 18b determines, at S135, that the job execution part 18a is not executing any job, the overwrite erasure thread 18b initiates a time calculation (S136).

Next, the overwrite erasure thread 18b determine whether or not a specified time interval elapses from the initiation of the time calculation at S136 (S137). Here, the specified time interval is, for example, 500 ms.

If the overwrite erasure thread 18b determines that the specified time interval does not elapse at S137, the overwrite erasure thread 18b determines whether or not the job execution part 18a is executing a job (S138).

If the overwrite erasure thread 18b determines, at S138, that the job execution part 18a is executing the job, the overwrite erasure thread 18b executes the process of S131.

If the overwrite erasure thread 18b determines, at S138, that the job execution part 18a is executing no job, the overwrite erasure thread 18b executes the process of S137.

If the overwrite erasure thread 18*b* determines, at S137, that the specified time interval elapses, the overwrite erasure thread 18*b* erases, similar to the process of S133, one obsolete file 21 in the trash box directory 32 by overwrite processing (S139).

After completion of the process of S139, the overwrite erasure thread 18*b* executes the process of S134.

As described above, in the operation illustrated in FIG. 5, the obsolete files are erased one by one by overwrite processing at the following timings.

(1) At a timing when an obsolete file is put into an empty trash box directory 32 while no jobs are in execution, or at a timing when an obsolete file is in the trash box directory 32 immediately after a job in execution terminates.

(2) At a timing when no job is found to be executed after an elapse of the specified time interval (for example, 50 ms in the present exemplary embodiment) that is counted from an overwrite erasure of an obsolete file.

Next, a description is made as to how the MFP 10 operates in a case where an obsolete file is generated in a job.

If an obsolete file is generated in a job, the size determination part 18*c* updates the size history 17*c* as to such an obsolete file generated in a job.

Then, a description is made as to how the MFP 10 operates for determining the threshold value size 17*b*.

Figure 7:
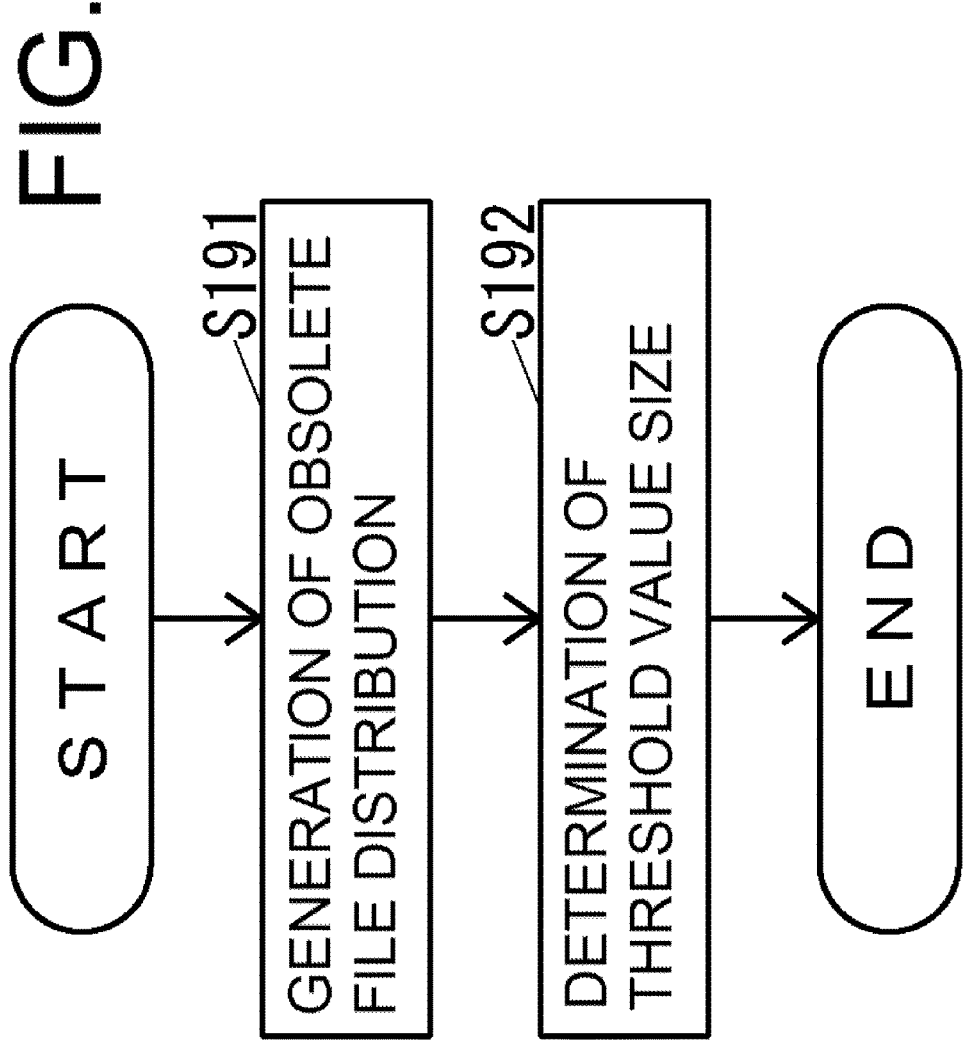
FIG. 7 is illustrates steps of an operation of the MFP illustrated in FIG. 1 when a threshold value size is determined.

The size determination part 18*c* executes an operation illustrated in FIG. 7 for determining the threshold value size 17*b*.

FIG. 7 illustrates steps of the operation of the MFP 10 when the threshold value size 17*b* is determined.

Figure 8:
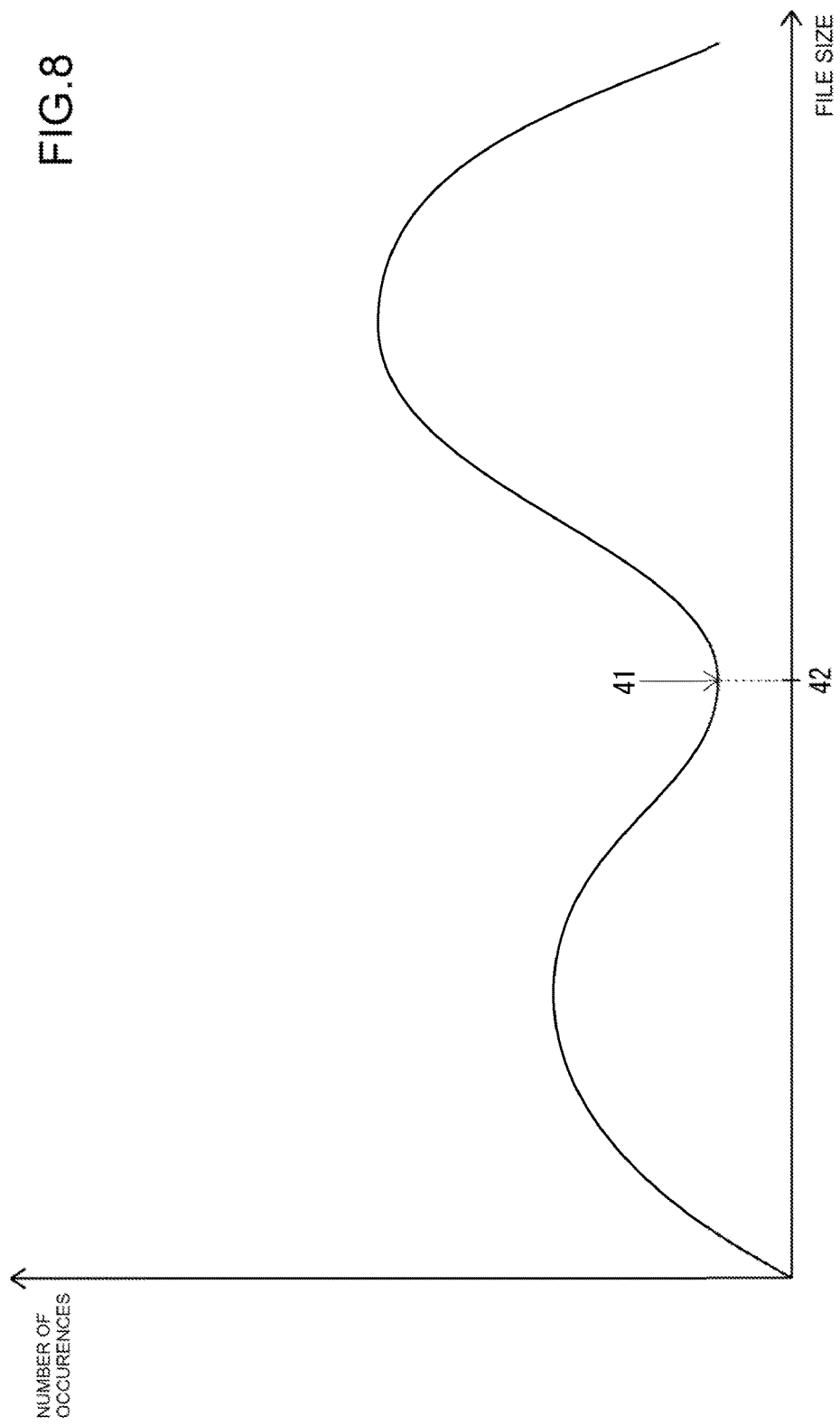
FIG. 8 illustrates an example of a distribution that is created by the operation illustrated in FIG. 7.

As illustrated in FIG. 7, the size determination part 18*c* creates, based on the size history 17*c*, a size distribution of obsolete files created within a past specified duration that is measured from the current time (S191) as illustrated in FIG. 8.

It is to be noted that the MFP 10 deals with files of image data and files of data other than the image data, the files including text-based files such as an address book and a metadata file for system management. In general, the file of image data is larger than the file of data other than the image data in size. Thus, in the distribution generated in S191, large-sized obsolete files and small-sized obsolete files are separated.

After completion of the operation of S191, the size determination part 18*c* determines a size 42 (refer to FIG. 8) corresponds to a valley 41 in the distribution generated at S191 (refer to FIG. 8) as a new threshold value size 17*b* (S192) and then terminates the operation illustrated in FIG. 7. More specifically, the size determination part 18*c* determines the threshold value size 17*b* based on statistics of the sizes of the obsolete files made unnecessary in the jobs.

It is to be noted that the operation illustrated in FIG. 7 maybe executed whenever the size history 17*c* is updated, at a regular timings, or at any timings.

As described above, the MFP 10 causes the overwrite erasure thread 18*b* to perform overwrite erasures of the obsolete files 21 intermittently while the job is out of execution (NO result of S132 or NO result of S138). More specifically, the MFP 10 causes the overwrite erasure thread 18*b* perform overwrite erasures of the obsolete files 21 with interval of time. Thus, even while no job is in execution, the MFP 10 makes it possible to execute a process whose existence is impossible to confirm for the overwrite erasure part 18*b* when the overwrite erasure thread 18*b* does not erase the obsolete file 21 by overwrite processing (NO Result of S137). As a result, the MFP 10 allows for avoiding a late execution of the process whose existence is impossible to confirm for the overwrite erasure thread 18*b*.

With such a configuration, the electronic device of the present disclosure or the electronic device that implements the information processing method of the present disclosure causes the overwrite erasure thread to erase the obsolete files by overwrite processing intermittently while no job is in execution. More specifically, the electronic device causes the overwrite erasure thread to erase the obsolete files by overwrite processing with interval of time, that makes it possible to execute a process whose existence is impossible to confirm for the overwrite erasure thread when the overwrite erasure thread does not erase the obsolete file by overwrite processing, even while no job is in execution. As a result, the electronic device allows for avoiding the late execution of the process whose existence is impossible to confirm for the overwrite erasure thread. Further, the electronic device of the present disclosure or the electronic device that implements the information processing method of the present disclosure erases, by overwrite processing, an obsolete file whose size is less than a specified value while a job is in execution, that makes it possible to reduce the number of object obsolete files to be erased intermittently by overwrite processing except when a job is in execution. Thus, it is possible for the electronic device to reduce an average time from when the file is made unnecessary in a job to when such a file is erased by overwrite processing.

For example, a process whose existence is impossible to confirm for the overwrite erasure thread 18*b*, such as a process accessing a document box by an order from the operation part 11 that is reserved as a specified area in the storage part 17 is not a job but is a process that accesses the storage part 17.

The MFP 10 causes the overwrite erasure thread 18*b* perform overwrite erasures of the obsolete files 21, one by one, with interval of time and one overwrite erasure is executed for only one obsolete file. For this reason, the MFP 10 makes it possible to restrict that overwrite erasure process of obsolete files that is made by the overwrite erasure thread 18*b* continues long. Thus, the MFP 10 is capable of restricting a delayed execution of the process whose existence is impossible to confirm by the overwrite erasure thread 18*b*. It is to be noted that the MFP 10 may cause the overwrite erasure thread 18*b* perform overwrite erasures of the obsolete files 21, in plural obsolete files 21 unit by unit at a time, with interval of time.

In such a way, in the electronic device of the present disclosure, the overwrite erasure part can perform overwrite erasures of the obsolete files, one by one, with interval of time in order to erase the obsolete files whose sizes are more than the specified value such that one overwrite erasure is executed for only one obsolete file.

With this configuration, the electronic device of the present disclosure causes the overwrite erasure thread to perform overwrite erasures of the obsolete files, one by one, with interval of time such that one overwrite erasure is executed for only one obsolete file. For this reason, the electronic device makes it possible to restrict that overwrite erasure process of obsolete files that is made by the overwrite erasure thread continues long. Thus, the electronic device of the present disclosure is capable of restricting a delayed execution of the process whose existence is impossible to confirm by the overwrite erasure thread.

The MFP 10 causes the overwrite erasure thread 18*b* to perform overwrite erasures of the obsolete files 21 with specified interval of time. For this reason, the MFP 10 makes it possible to restrict that the overwrite erasure process of obsolete files 21 that is made by the overwrite erasure thread 18b continues long. Thus, the MFP 10 is capable of restricting a delayed execution of the process whose existence is impossible to confirm by the overwrite erasure thread 18b. It is to be noted that the MFP 10 may cause the overwrite erasure thread 18b to perform overwrite erasures of the obsolete files 21 at an irregular time interval.

In such a way, in the electronic device of the present disclosure, the overwrite erasure part may perform overwrite erasures intermittently by overwrite erasures with specified interval of time.

According to this configuration, the electronic device of the present disclosure causes the overwrite erasure thread to erase the obsolete files by overwrite processing with specified time of interval, that makes it possible to restrict that the overwrite erasure process of obsolete files that is made by the overwrite erasure thread continues long. Thus, the electronic device of the present disclosure is capable of restricting the delayed execution of the process whose existence is impossible to confirm by the overwrite erasure thread.

The MFP 10 erases, by overwrite process, the obsolete file 22 whose size is less than the threshold value size 17b when a job is in execution (NO result of S101 and S103). For this reason, the MFP 10 makes it possible to reduce the number of object obsolete files 21 to be erased intermittently by overwrite processing by the overwrite erasure thread 18b except when a job is in execution. Thus, it is possible to reduce an average time from when the file is made unnecessary in a job to when such a file is erased by overwrite processing. An early erasure of the obsolete file is preferable from the view point of security.

In addition, the MFP 10 is capable of reducing the average time from when the file is made unnecessary in a job to when such a file is erased by overwrite processing, that provides a remarkable effect of restricting that the whole storage capacity of the storage part 17 is occupied by many obsolete files.

In particular, in a case where the storage part 17 is the SSD (Solid State Drive) of small storage capacity, the MFP 10 has a remarkable advantage of suppressing the storage region of the storage part 17 is fully occupied by many obsolete files when compared to a case where the storage part 17 is the HDD of large storage capacity.

The MFP 10 erases, by overwrite processing, the obsolete file whose size is more than the threshold value size 17b i.e. the obsolete file of large size except while a job is in execution. For this reason, the MFP 10 makes it possible to restrict a late termination of the job that results from the overwrite erasure of the large size obsolete file. Thus, in case where plural jobs are to be executed sequentially, it is possible for MFP 10 to restrict that an extension of time duration from when the first job of the plural jobs begins to execute to when the last job of the plural jobs terminates its execution. On the other hand, the MFP 10 erases, by overwrite processing, the obsolete file whose size is less than the threshold value size 17b i.e. the small size obsolete file while the job is in execution. At this stage, a processing time required for performing the overwrite erasure of the small size obsolete file is inherently short. Thus, the MFP 10 performs the overwrite erasure of the small size obsolete file, that makes it possible to restrict that the job terminate is made delayed.

The MFP 10 changes the size of the obsolete file that is to be erased by overwrite processing while the job is in execution, i.e. the threshold value size 17b depending on the actual operation condition of the MFP 10 per se (S161, S191, and S192). Thus, the MFP 10 is capable of reducing properly the average time from when the file is made unnecessary in a job to when such a file is erased by overwrite processing.

As described above, the electronic device of the present disclosure includes the size determination part that determines the specified size, that may be determined based on statistics of size of the obsolete files i.e. the obsolete file that are made unnecessary in the job.

With this configuration, the electronic device of the present disclosure changes the size of the obsolete file that is to be erased by overwrite processing while the job is in execution, depending on the actual operation condition of the electronic device per se, that makes it possible to reduce properly the average time from when the file is made unnecessary in a job to when such a file is erased by overwrite processing.

It is to be noted that the MFP 10 may change the threshold value size 17b automatically by a method other than the method changing the threshold value 17b depending on the actual operation condition of the MFP 10.

In addition, the MFP 10 allows that the threshold value size 17b is a fixed value size. For example, the MFP 10 may be allowed to determine the threshold value 17b at the development stage of the MFP 10 based on a distribution that is generated by a process similar to the process of S191. Further, the MFP 10 may be configured such that at its development stage the threshold value size 17b is determined for allowing the MFP 10 to offer specific performances that include, for example, executing a copy job for a manuscript of 10 pages that is to be performed within specified time duration from the start to the end.

The MFP 10 manages and erases by overwrite processing the obsolete file whose size is more than the threshold value size 17b, in the same directory i.e. the trash box directory 32, that makes it possible to enhance the efficiency in processing the overwrite erasure.

In typical electronic devices, in a case where jobs includes not only a process whose existence is possible to confirm for the overwrite erasure thread, but also a process whose existence is impossible to confirm for the overwrite erasure thread, if there are many obsolete files as objects that the overwrite erasure thread erases by overwrite processing, the overwrite erasure of the obsolete file that is performed by the overwrite erasure thread will increase a CPU task burden. For this reason, in typical electronic devices, there is a problem of possible delay of executing a process whose existence is impossible to confirm by the overwrite erasure thread.

In view of the above circumstances, an object of the present disclosure is to provide an electronic device and an information processing method that are capable of restricting the delay of executing a process whose existence is impossible to confirm by the overwrite erasure thread.

The electronic device and the information processing method of the present disclosure are capable of restricting the delay of executing a process whose existence is impossible to confirm by the overwrite erasure thread.

The electronic device of the present disclosure is embodied in the MFP in the present exemplary embodiment, but may be in the form of image forming devices, other than the MFPs, that include printer dedicated machines, copy dedicated machines, facsimile dedicated machines, and scan dedicated machines, or may be in the form of electronic devices, other than the image forming devices, that include PCs.

What is claimed is:

1. An electronic device, comprising:
a job execution part that executes a job; and
an overwrite erasure part that performs an overwrite erasure of an obsolete file, the overwrite erasure part performing the overwrite erasure intermittently while the job is out of execution when the obsolete file among files that are made obsolete in the job has a size more than a specified size, the job execution part performing the overwrite erasure while the job is in execution when the obsolete file is of a size less than the specified size.

2. The electronic device according to claim 1, wherein the overwrite erasure part erases the obsolete files by overwrite processing one by one with interval of time for the intermittent overwrite erasures and the obsolete files are erased by overwrite processing whose sizes are more than the specified value such that one overwrite erasure is executed for only one obsolete file.

3. The electronic device according to claim 1, wherein the overwrite erasure part erases the obsolete files by overwrite processing with specified interval of time for the intermittent overwrite erasures.

4. The electronic device according to claim 1 further comprising a size determination part that determines the specified size,
the size determination part determining the specified size based on statistics of the size of the obsolete files that are made unnecessary in the job.

5. A computer-readable non-transitory storage medium in which an information processing program is stored that is executed by a computer of an electronic device, the information processing program, when being executed, causing the computer to act as;
a job execution part that executes a job; and
an overwrite erasure part that performs overwrite erasures of obsolete files, the overwrite erasure part performing the overwrite erasures intermittently except while the job is in execution when the obsolete files among files that are made obsolete in the job have a size more than a specified size, the job execution part performs the overwrite erasures while the job is in execution when the obsolete files have a size less than the specified size.

* * * * *